United States Patent
Kim et al.

(10) Patent No.: US 12,486,027 B2
(45) Date of Patent: Dec. 2, 2025

(54) LANDING GEAR SYSTEM FOR MOBILE OBJECT

(71) Applicants: Hyundai Motor Company, Seoul (KR); Kia Corporation, Seoul (KR)

(72) Inventors: Choung Hyoung Kim, Anyang-si (KR); Hong Ju Lee, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 181 days.

(21) Appl. No.: 18/198,910

(22) Filed: May 18, 2023

(65) Prior Publication Data
US 2024/0182158 A1  Jun. 6, 2024

(30) Foreign Application Priority Data
Dec. 6, 2022  (KR) .................. 10-2022-0169054

(51) Int. Cl.
| | | |
|---|---|---|
| *B64C 25/26* | (2006.01) | |
| *B64C 25/12* | (2006.01) | |
| *B64C 25/24* | (2006.01) | |
| *B64C 25/50* | (2006.01) | |
| *F16H 37/12* | (2006.01) | |

(52) U.S. Cl.
CPC .............. *B64C 25/26* (2013.01); *B64C 25/12* (2013.01); *B64C 25/24* (2013.01); *B64C 25/50* (2013.01); *F16H 37/122* (2013.01)

(58) Field of Classification Search
CPC ......... B64C 25/20; B64C 25/24; B64C 25/26; B64C 25/50
See application file for complete search history.

(56) References Cited

U.S. PATENT DOCUMENTS

| | | | |
|---|---|---|---|
| 2,222,850 A | 11/1940 | Maclaren | |
| 2,613,961 A * | 10/1952 | Wescott | B64C 25/26 403/201 |
| 8,070,094 B2 * | 12/2011 | Collins | B64C 25/12 244/102 SL |
| 8,651,418 B2 * | 2/2014 | Moine | B64C 25/50 244/50 |

(Continued)

FOREIGN PATENT DOCUMENTS

| | | |
|---|---|---|
| EP | 2987724 A1 | 2/2016 |
| EP | 3795468 A1 | 3/2021 |

(Continued)

OTHER PUBLICATIONS

Apr. 12, 2024—(EP) European Search Report—App No. 23208748.6.

*Primary Examiner* — Joseph W Sanderson
(74) *Attorney, Agent, or Firm* — Banner & Witcoff, Ltd.

(57) ABSTRACT

A gear system for a mobile object may include: a first shaft unit configured to adjust a driving direction of a fuselage; a second shaft unit coupled to the first shaft unit and configured to retract the first shaft unit into the fuselage or extend the first shaft unit, retracted into the fuselage, from the fuselage; a driver configured to supply driving force through which the first shaft unit and the second shaft unit can move; and a power transmission unit configured to selectively transmit the driving force of the driver to one of the first shaft unit and the second shaft unit by coupling the driver to one of the first shaft unit and the second shaft unit.

16 Claims, 7 Drawing Sheets

(56) References Cited

U.S. PATENT DOCUMENTS

| | | | |
|---|---|---|---|
| 8,684,306 B2 * | 4/2014 | Martin | B64C 25/26 244/102 SL |
| 8,752,790 B2 * | 6/2014 | Humphrey | B64C 25/505 244/102 A |
| 9,290,265 B2 | 3/2016 | Martin et al. | |
| 9,499,259 B2 * | 11/2016 | Guering | B64C 25/26 |
| 9,868,518 B2 * | 1/2018 | Elliott | B64C 25/34 |
| 9,988,144 B2 | 6/2018 | Perkins et al. | |
| 10,308,351 B2 * | 6/2019 | Thompson | B64C 25/34 |
| 10,669,017 B2 * | 6/2020 | Simpson | B64C 25/22 |
| 10,933,982 B2 | 3/2021 | Hubbard et al. | |
| 11,066,153 B2 * | 7/2021 | Fazeli | B64C 25/24 |
| 11,433,993 B2 * | 9/2022 | Allen | B64C 25/50 |
| 11,498,662 B2 * | 11/2022 | Kulkarni | B64C 25/20 |
| 11,814,159 B2 * | 11/2023 | Acks | F16H 19/04 |
| 2009/0294578 A1 * | 12/2009 | Humphrey | B64C 25/505 244/50 |
| 2010/0012779 A1 * | 1/2010 | Collins | B64C 25/30 244/102 R |
| 2012/0112000 A1 * | 5/2012 | Moine | B64C 25/22 244/102 A |
| 2012/0187239 A1 * | 7/2012 | Martin | B64C 25/26 244/50 |
| 2014/0239119 A1 * | 8/2014 | Martin | B64C 25/50 244/50 |
| 2015/0175255 A1 * | 6/2015 | Guering | B64C 25/14 244/102 A |
| 2016/0052623 A1 * | 2/2016 | Elliott | B64C 25/18 244/102 R |
| 2016/0347445 A1 * | 12/2016 | Thompson | B64C 25/34 |
| 2018/0244371 A1 | 8/2018 | Simpson et al. | |
| 2021/0086891 A1 * | 3/2021 | Fazeli | B64C 25/22 |
| 2021/0107632 A1 * | 4/2021 | Kulkarni | B64C 25/20 |
| 2021/0140539 A1 * | 5/2021 | Allen | B64C 25/50 |
| 2021/0245869 A1 * | 8/2021 | Acks | B64C 25/22 |
| 2022/0177118 A1 | 6/2022 | Sharpe | |

FOREIGN PATENT DOCUMENTS

| | | |
|---|---|---|
| GB | 2459714 A | 11/2009 |
| JP | 2008-104599 A | 5/2008 |
| KR | 10-2011-0015036 A | 2/2011 |
| KR | 101288898 B1 | 7/2013 |
| KR | 10-2015-0098731 A | 8/2015 |
| KR | 10-2018-0099554 A | 9/2018 |
| WO | 2010-009289 A2 | 1/2010 |

* cited by examiner

LANDING GEAR SYSTEM FOR MOBILE OBJECT

CROSS-REFERENCE TO RELATED APPLICATION(S)

This application claims benefit of priority to Korean Patent Application No. 10-2022-0169054 filed on Dec. 6, 2022, in the Korean Intellectual Property Office, the disclosure of which is incorporated herein by reference in its entirety.

BACKGROUND

1. Field

The present disclosure relates to a gear system for a mobile object.

2. Discussion of the Background

A gear system of an urban air mobility vehicle may be a device that supports a load of the urban air mobility vehicle during taking off or landing of the urban air mobility vehicle and changes a direction during taxiing on the ground. The gear system of the urban air mobility vehicle may retract a landing gear inside a fuselage of the urban air mobility vehicle so as to reduce air resistance during flight.

At least some gear system of urban air mobility vehicle may operate in a hydraulic manner. For example, the gear system of the urban air mobility vehicle may use a linear actuator to retract the landing gear of the urban air mobility vehicle into a fuselage so as to reduce air resistance, or lower the landing gear below the fuselage so as to support a load of the urban air mobility vehicle. In addition, the gear system of the urban air mobility vehicle may be equipped with an additional rotary actuator for steering and may be used to change the direction of the urban air mobility vehicle on the ground.

On the other hand, since a linear actuator and a rotary actuator applied to the urban air mobility vehicle are hydraulically implemented, a hydraulic system such as a hydraulic pipe as well as a separate hydraulic pump and motor may be required, which may cause the system to be complicated and heavy.

SUMMARY

The following summary presents a simplified summary of certain features. The summary is not an extensive overview and is not intended to identify key or critical elements.

In order to solve at least some of the above-mentioned problems, an aspect of the present disclosure is to provide a gear system for a mobile object which can perform both a steering function of a landing gear of mobile object and a function of retracting or extending the landing gear into or from a fuselage, with a single driver.

A gear system may comprise: a first shaft device configured to adjust a driving direction of a fuselage; a second shaft device coupled to the first shaft device and configured to retract the first shaft device into the fuselage or extend the first shaft device from the fuselage; a driver configured to supply driving force to operate one of the first shaft device and the second shaft device; and a power transmission device configured to selectively transfer the driving force of the driver to the one of the first shaft device and the second shaft device by coupling the driver to the one of the first shaft device and the second shaft device.

The driver may comprise an electric motor configured to supply the driving force to the one of the first shaft device and the second shaft device.

The driver may be configured to supply, by using an electric motor, driving force to the first shaft device or to the second shaft device.

The second shaft device may comprise: a first gear formed on at least a portion of an outer circumferential surface of a second shaft; a second gear spaced apart from the first gear and connected to the power transmission device; and a flexible drive transmission member configured to couple the first gear and the second gear.

The flexible drive transmission member may comprise a gear chain or a timing belt.

The gear system may comprise a guide link configured to guide a path through which the first shaft device is retracted into, or extended from, the fuselage.

The guide link may comprise: a first link comprising one end coupled to the fuselage; and a second link comprising a first end coupled to the first link and a second end coupled to the first shaft device.

The gear system may comprise a fixing unit configured to fix the first shaft device to the fuselage while the first shaft device is retracted into the fuselage.

The gear system may comprise a guide link configured to guide a path through which the first shaft device is retracted into, or extended from, the fuselage, wherein the fixing unit is configured fix the fuselage and the guide link in a state in which the first shaft device is retracted into the fuselage.

The fixing unit may comprise a fixing pin protruding from at least a portion of the guide link, and wherein in a state in which the first shaft device is retracted into the fuselage, the fixing pin is inserted into and fixed to a fixing body provided in the fuselage.

The fixing pin may comprise: a pin body portion comprising a first end coupled to the guide link, wherein the pin body portion protrudes from the guide link to have a predetermined length; and a pin head portion disposed at a second end of the pin body portion, wherein at least a portion of the pin head portion forms a cross-sectional area larger than a cross-sectional area of the pin body portion.

The fixing body may comprise: a fixing ring configured to form a fixing hole through which the fixing pin can penetrate; and a stopper configured to reduce a size of the fixing hole.

A gear system may comprise: a landing gear comprising a first shaft and a second shaft configured to rotate in different directions, wherein the first shaft is configured to change a driving direction of a fuselage, and the second shaft is configured to retract or extend the first shaft into or from the fuselage; and a driver configured to supply driving force to rotate one of the first shaft and the second shaft, wherein the driver comprises an electric motor configured to supply the driving force to the one of the first shaft and the second shaft.

The gear system may comprise: a power transmission device configured to couple one of the first shaft and the second shaft to the driver; and a controller configured to control the driver and the power transmission device, wherein the controller is configured to control the power transmission device so that the driver is connected to only one of the first shaft and the second shaft.

The controller may be configured to control the power transmission device so that when a tire is in contact with the ground, the first shaft is connected to the driver.

The controller may be configured to control, based on a speed of the fuselage exceeding a predetermined speed, the power transmission device to disconnect the driver from the first shaft.

The controller may be configured to control, based on the fuselage being taken off from the ground, the power transmission device to connect the second shaft and the driver.

The gear system may comprise a fixing unit configured to fix the first shaft to the fuselage in a state in which the first shaft is retracted into the fuselage, wherein the controller is configured to control the fixing unit to fix the first shaft to the fuselage.

The controller may be configured to control the power transmission device, in a state in which the first shaft is fixed to the fuselage, to disconnect the driver from the first shaft and the second shaft.

According to an aspect of the present disclosure, a steering function and a deployment function of mobile object may be respectively performed through one driver, thereby removing an existing hydraulic system and achieving lightweightness of a gear system.

Since a steering function and a deployment function of a mobile object are respectively performed through one driver, an internal space of the mobile object can be utilized more efficiently than the conventional technology using a separate hydraulic system.

By transmitting power to an impact load path acting on a landing gear during landing using a flexible drive transmission member, a load may be prevented from being directly transmitted to a driver, and durability may be ensured.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
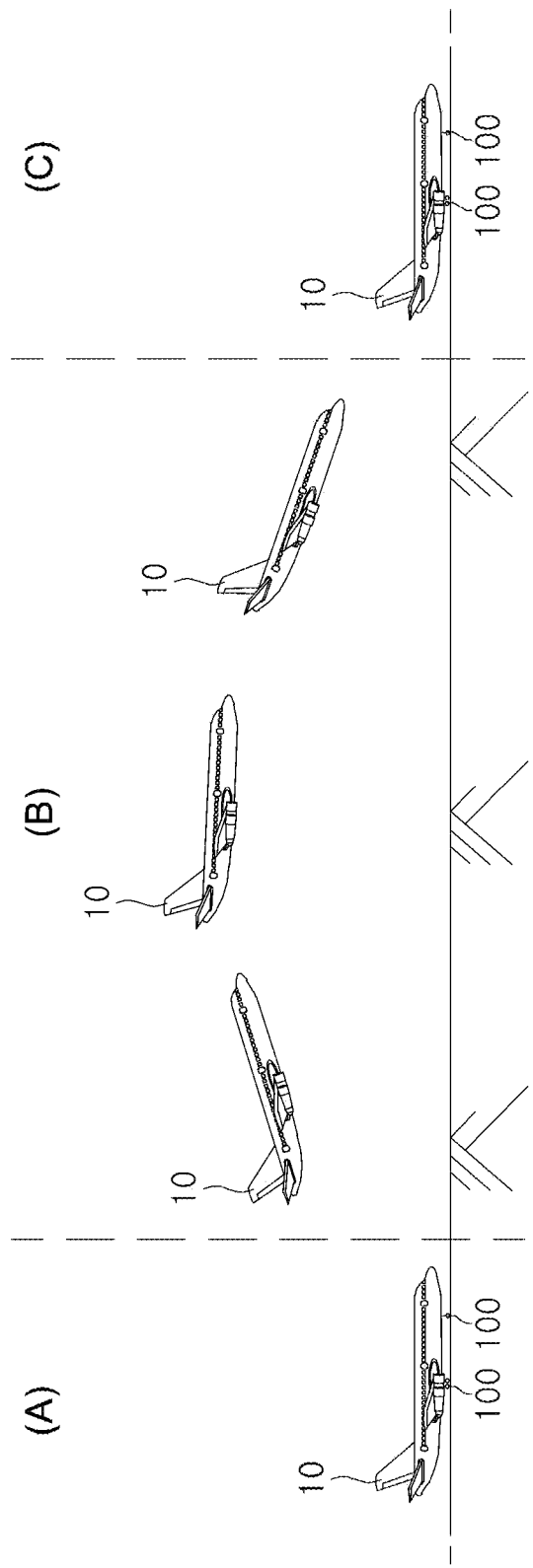
FIG. 1 is a view illustrating an operation of a gear system for a mobile object according to a flight process of mobile object.

Hereinafter, the present disclosure may make various changes and provide various examples, specific examples thereof will be described and illustrated in the drawings. However, the aspects of the disclosure are not intended for limiting the scope of the invention. The idea of the present disclosure should be construed to extend to any alterations, equivalents and substitutes besides the accompanying drawings.

It will be understood that although the terms first, second, etc., may be used herein to describe various elements, these elements should not be limited by these terms. These terms are generally only used to distinguish one element from another. For example, a first element could be termed a second element, and, similarly, a second element could be termed a first element, without departing from the scope of the present disclosure. The term of and/or encompasses a combination of plural items or any one of the plural items.

The term used herein is for the purpose of describing particular examples only and is not intended to be limiting of the present disclosure. The singular also includes the plural unless specifically stated otherwise in the phrase. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which example embodiment(s) of the present disclosure belong. It will be further understood that the terms, such as those defined in commonly used dictionaries, should be interpreted as having meanings that are consistent with their meanings in the context of the relevant art and will not be interpreted in an idealized or overly formal sense unless expressly so defined herein.

In the present specification, mobile object may refer to a mobility vehicle that may move by flying over the sky. That is, in addition to referring to helicopters, drones, fixed-wing airplanes, and the like, mobile object may include vehicles that can move on the ground using wheels and then fly with the wheels separated from the ground. In addition, a mobile object may include manned and unmanned mobile object. The manned mobile object may include an airplane that can be operated by autonomous flight, in addition to an airplane controlled by a pilot.

In the present specification, gear system may include a landing gear system.

Hereinafter, various examples of the present disclosure will be described with reference to the attached drawings.

FIG. 1 is a view illustrating an operation of a gear system for a mobile object according to a flight process of mobile object.

Referring to FIG. 1, a mobile object may start a flight through a takeoff process on the ground and terminate the flight through a landing process. The takeoff and landing processes may be performed on the ground, and the mobile object may be moved by changing a direction on the ground.

As exemplarily illustrated in section A, the mobile object may drive on a runway to prepare for takeoff. Here, a landing gear 100 of the mobile object may be exposed to the outside of a fuselage 10 so that a tire (e.g., a tire 113 shown in FIG. 2) provided in one end of the landing gear 100 is in contact with the ground to support a load of the fuselage 10, and may adjust a driving direction of the fuselage 10.

As exemplarily illustrated in section B, the mobile object may fly from takeoff to landing. The mobile object may fly using lift generated from wings of the fuselage 10, and the landing gear 100 may be retracted into the fuselage 10 to reduce air resistance of the mobile object.

As exemplarily illustrated in section C, the mobile object may land back to the ground upon completion of the flight. The landing gear 100 retracted into the fuselage 10 of the mobile object may be extended (deployed) from the fuselage 10 like section A so that the tire 113 provided in one end of the landing gear 100 may support a load of the mobile object while coming into contact with the ground, and may adjust the driving direction of the mobile object.

In at least some implementations, the gear system of the mobile object, including the tire 113, has to have the function of supporting the load of the mobile object on the ground before takeoff and after landing, a steering function of adjusting the direction, the function of retracting the landing gear 100 of the mobile object into the fuselage to reduce the air resistance when the mobile object is in flight, and the function of extending the landing gear 100 back from the fuselage 10 during the landing.

At least some gear system may implement the above-described steering function and the function of retracting or extending the landing gear 100 through a separate system. At least some gear system may control each system using a hydraulic device, which may complicate the system, increase weight due to accessories such as a hydraulic pump, a hydraulic pipe and a hydraulic cylinder, and reduce a space inside the fuselage 10.

One or more gear systems of the present disclosure described herein may implement a system that controls the driving direction of the fuselage 10 on the ground, retracts the landing gear 100 into the fuselage 10 when the mobile object takes off from the ground, and extends the landing gear 100 externally from the fuselage 10 during the landing. By controlling the steering of the fuselage 10 and generating driving force to retract or extend the landing gear 100 using an electric motor, not a hydraulic system, it may be possible to simplify the system by removing the hydraulic pump, the hydraulic pipe, the hydraulic cylinder, and to secure additional space.

Figure 2:
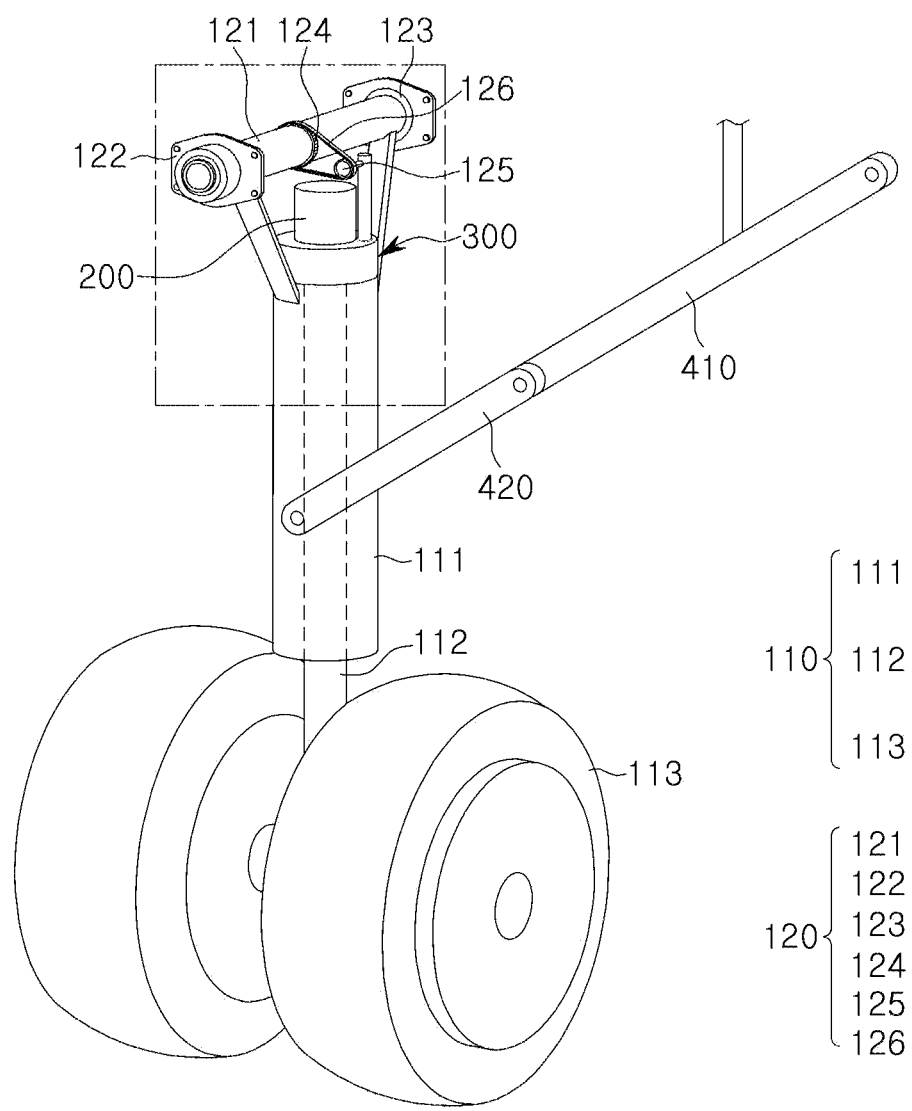
FIG. 2 is a perspective view of the gear system for a mobile object.
Figure 3:
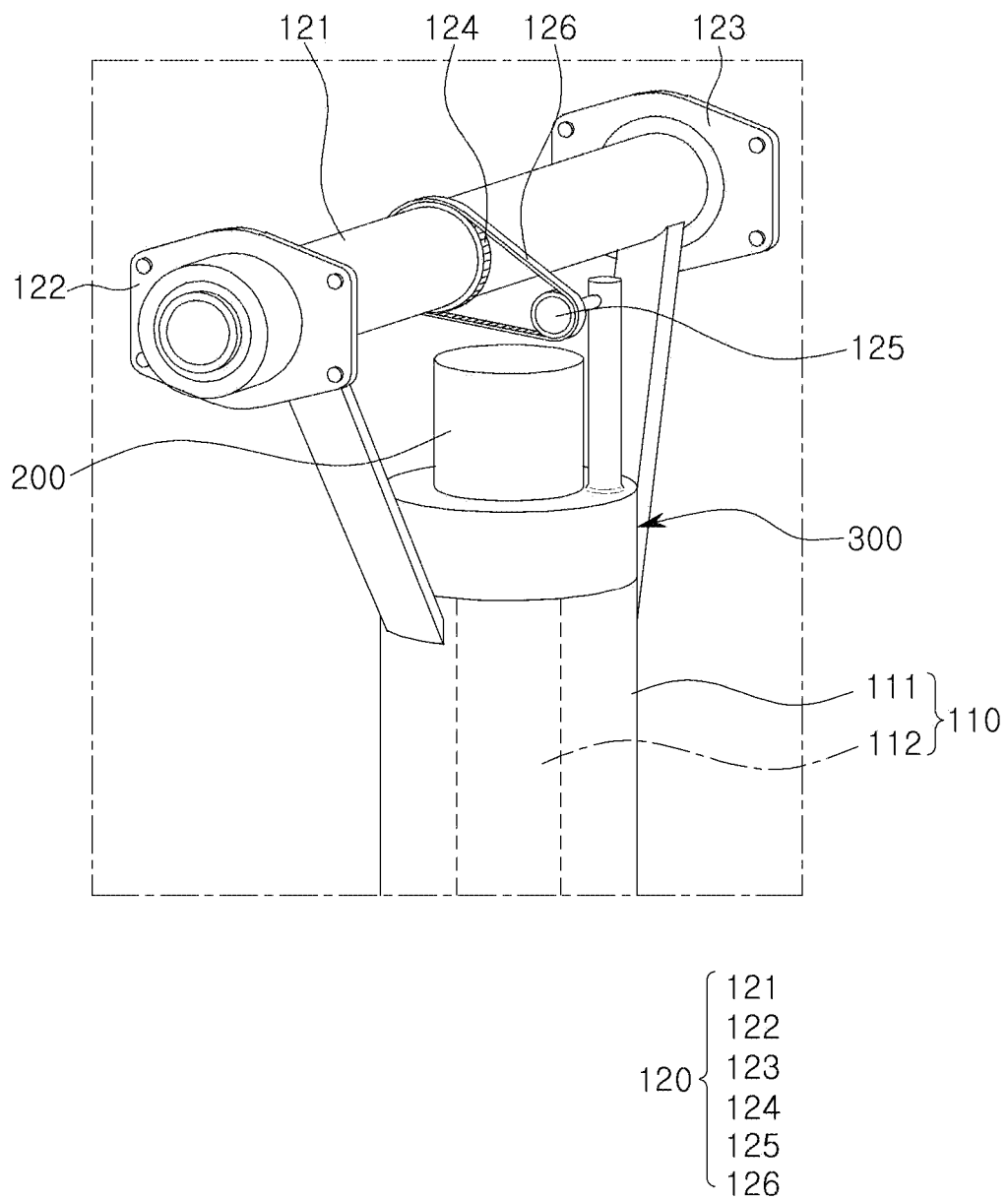
FIG. 3 is an enlarged view of FIG. 2.

FIG. 2 is a perspective view of the gear system for a mobile object, and FIG. 3 is an enlarged view of FIG. 2.

The gear system for a mobile object according to the present disclosure may include the landing gear 100 including a first shaft device (e.g., a first shaft unit 100) configured to steer the fuselage of the mobile object on the ground using the landing gear 100 and a second shaft device (e.g., a second shaft unit 120) configured to retract the landing gear 100 including the first shaft unit 110 into the fuselage 10 or extend the retracted landing gear 100 externally from the fuselage 10, a driver 200 configured to supply driving force through which the first shaft unit 110 and the second shaft unit 120 can move; and a power transmission (e.g., a power transmission unit 300) configured to selectively transmit the driving force generated by the driver 200 to the first shaft unit 110 or the second shaft unit 120 by coupling the driver to one of the first shaft unit 110 and the second shaft unit 120 comprised in (e.g., constituting) the landing gear 100.

The landing gear 100 may include the first shaft unit 110 and the second shaft unit 120. The first shaft unit 110 may support the load of the fuselage 10 and steer the driving direction when the fuselage 10 of the mobile object lands or drives on the ground. The first shaft unit 110 may include a casing 111, a first shaft 112, and a tire 113. The first shaft unit 110 may further include a damper (not illustrated) capable of mitigating an impact applied during the landing.

The casing 111 may have a cylindrical structure extending in a longitudinal direction of the first shaft 112, and may surround the first shaft 112 in a state in which the casing 111 is spaced apart from the first shaft 112 by a predetermined interval. One end of the first shaft 112 may be connected to the tire 113 and the other end thereof may be connected to the power transmission unit 300. The casing 111 may be fixed to the second shaft unit 120 described below, and the first shaft 112 may rotate separately from the casing 111 surrounding an exterior of the first shaft 112. Accordingly, since the first shaft 112 is supported by the casing 111 fixed to the second shaft unit 120, the fuselage 10 of the mobile object may drive on the ground and steer the driving direction.

At least one tire 113 may be provided and connected to the other end of the first shaft 112. The tire 113 may support the load of the fuselage 10 of the mobile object on the ground, and may rotate integrally with the rotation of the first shaft 112 to steer the driving direction.

The second shaft unit 120 may introduce the landing gear 100 (e.g., including the first shaft unit 110) into the fuselage 10. The second shaft unit 120 may include a second shaft 121, a first gear 124, a second gear 125, and a flexible drive transmission member 126.

The second shaft 121 may extend with a predetermined length, and opposite ends thereof may be rotatably coupled to the fuselage 10 through a first bearing 122 and a second bearing 123. The second shaft 121 may include the first gear 124 formed along an outer circumferential surface. The first gear 124 may be connected to the second gear 125 through the flexible drive transmission member 126. The second gear 125 may be coupled with the power transmission unit 300 to transmit the driving force of the driver 200 to the first gear 124 through the flexible drive transmission member 126. In at least some implementations, a large impact may be applied to the landing gear 100 during the landing, and when the driver 200 and the power transmission unit 300 are directly connected to the second shaft unit 120 through a gear, the impact may be directly transmitted to the driver 200 and the power transmission unit 300, which may damage the gear and the like. On the other hand, in the gear system for a mobile object according to the present disclosure, since the driver 200 and the power transmission unit 300 may be connected to the second shaft unit 120 through the flexible drive transmission member 126 to receive the driving force, an impact load acting on the landing gear 100 during the landing may be reduced and/or prevented from being directly applied to the driver 200 and the power transmission unit 300, thereby improving durability. The flexible drive transmission member 126 may be a gear chain or a timing belt connecting two gears, but aspects are not limited as such. As described above, the second shaft 121 may be coupled to the casing 111 of the first shaft unit 110 and support the casing 111, and the first shaft 112 of the first shaft unit 110 may be rotatable separately from the fixed casing 111. Accordingly, the second shaft unit 120 and the first shaft unit 110 may not interfere with each other, the second shaft unit 120 may retract or extend the first shaft unit 110 into and from the fuselage 10, and the first shaft unit 110 may perform steering while being extended externally from the fuselage 10.

The driver 200 may be an electric motor that generates power using electricity. The electric motor may be a direct current (DC) motor or an alternate current (AC) motor depending on the power source used. The DC motor may be a brush motor, a brushless motor, a stepping motor, or the like, and the AC motor may be an induction motor, a synchronous motor, or the like, but the aspects of the present disclosure are not limited thereto. Various electric motors may be applied depending on power used in the applied mobile object and installation conditions. The driver 200 of the landing system may steer the landing gear 100 or retract or extend the landing gear 100 into or from the fuselage 10, by generating the driving force through the electric motor instead of using a hydraulic system that used hydraulic pressure to generate the driving force. Accordingly, devices such as a hydraulic pump, a hydraulic pipe, and a hydraulic cylinder may be replaced with the electric motor and electrical wiring related thereto, thereby achieving lightweightness of the gear system.

The power transmission unit 300 may include a plurality of gears, and may selectively transmit the driving force generated from the driver 200 to the first shaft unit 110 or the second shaft unit 120. For example, the power transmission unit 300 may be coupled to a shaft of the electric motor by the gear. A pinion gear may be provided in a portion of the shaft of the electric motor, and at least a portion of the power transmission unit 300 may include a worm gear corresponding to the pinion gear, thus transmitting the driving force generated from the driver 200 to the first shaft unit 110 and rotating and steering the first shaft 112. The power transmission unit 300 may include a shaft gear corresponding to the pinion gear, and may transmit the driving force of the electric motor to the second gear 125 of the second shaft unit 120 using the shaft gear. The second gear 125 may rotate the first gear 124 fixed to the second shaft 121 through the flexible drive transmission member 126, thereby retracting the landing gear 100 including the first shaft unit 110 into the fuselage 10 or extending the landing gear 100 externally from the fuselage 10. The power transmission unit 300 may transmit the driving force of the electric motor to the first shaft unit 110 or the second shaft unit 120 by coupling the worm gear or the shaft gear to the pinion gear of the electric motor according to the command of the controller 600. However, the power transmission unit 300 is not limited to the worm gear or the shaft gear, and may be formed of a set of various gears capable of selectively transmitting the driving force of the electric motor to the first shaft unit 110 or the second shaft unit 120.

Figure 4:
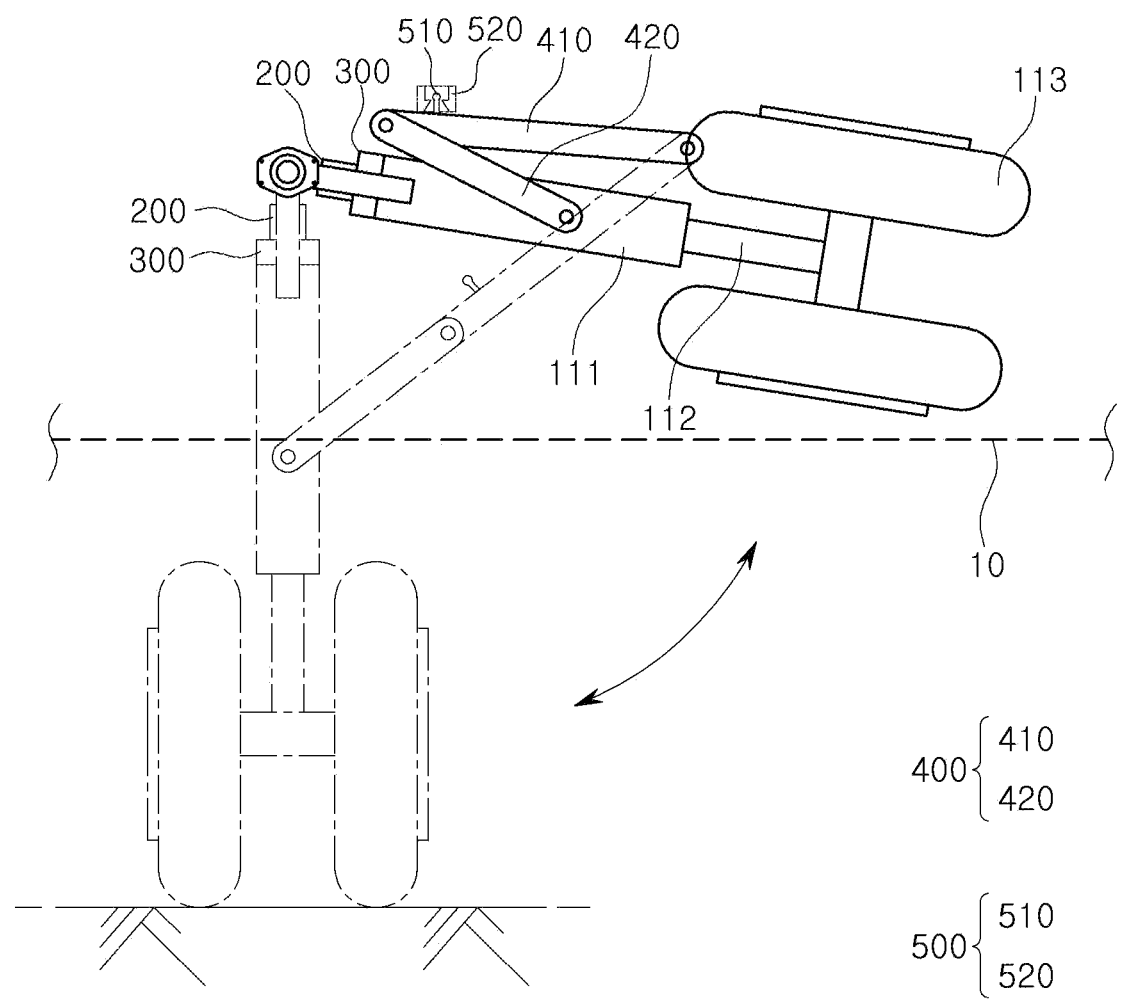
FIG. 4 is a view illustrating an example state of the gear system for a mobile object according to an operation of a second shaft unit.

The gear system for a mobile object may further include a guide link unit 400 that prevents collision with the fuselage in the process of retracting or extending the landing gear by allowing the landing gear 100 to be retracted into or extended from the fuselage 10 along a substantially constant path. FIG. 4 is a view illustrating a state of the gear system for a mobile object according to an operation of the second shaft unit 120. Referring to FIG. 4, one end of the guide link unit 400 may be coupled to the fuselage 10 and the other end thereof may be coupled to a portion of an outer surface of the casing 111. The guide link unit 400 may include a first link 410 and a second link 420 in which one side thereof is rotatably coupled to each other. One side of the first link 410 may be rotatably coupled to the second link 420, and the other side thereof may be rotatably coupled to a portion of the fuselage 10. One side of the second link 420 may be rotatably coupled to the first link 410, and the other side thereof may be rotatably coupled to the first shaft unit 110 (e.g., the outer surface of the casing 111). Since the first shaft unit 110 is steered according to the rotation of the first shaft 112 penetrating through the casing 111 in a state in which the casing 111 is not rotated and is fixed, the steering function of the first shaft unit 110 may not be interfered even if the guide link 400 is coupled to the casing 111. The guide link unit 400 may have sufficient rigidity and may be provided in a form in which at least two links extending with a predetermined length are coupled, and when the second shaft unit 120 rotates and retracts the first shaft unit 110 into the fuselage 10, the form of the guide link unit 400 may help to move the first shaft unit 110 in a coupling direction of the guide link unit 400 without shaking the first shaft unit 110 left and right.

Figure 5C:
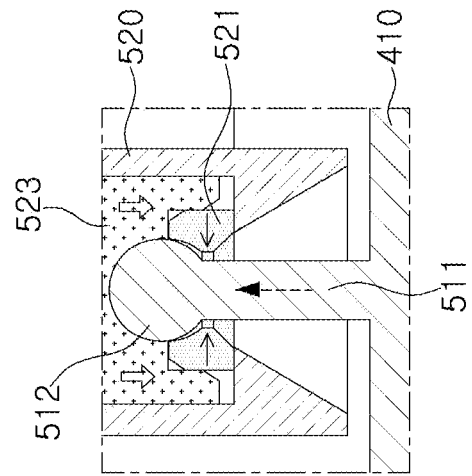
FIG. 5A, FIG. 5B, and FIG. 5C are a view illustrating an example operation of a fixing unit.
Figure 5B:
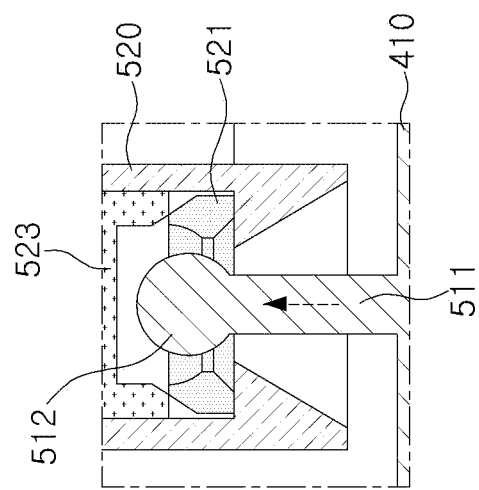
Figure 5A:
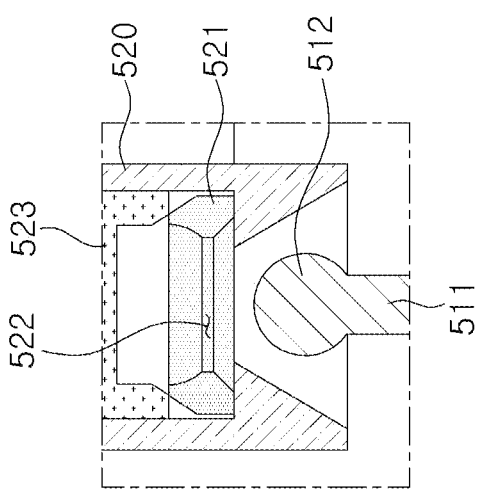

The gear system for a mobile object according to the present disclosure may further include a fixing unit 500. The fixing unit 500 may be fixed in a state in which the landing gear 100 is retracted into the fuselage 10, and may prevent the landing gear 100 from vibrating excessively even when the fuselage 10 vibrates, and prevent the landing gear from being drawn out due to a malfunction during flight. FIG. 5A, FIG. 5B, and FIG. 5C are exemplary views illustrating an operation of a fixing protrusion (e.g., the fixing unit 500). Referring to FIG. 5A, FIG. 5B, and FIG. 5C, the fixing unit 500 may further include at least one fixing pin unit 510 formed in the guide link unit 400, and a fixing body unit 520 including a fixing ring 521 and a stopper 523 formed in a portion of the fuselage 10 so that the landing gear 100 may be coupled to the fixing body unit 520 while be completely retracted into the fuselage 10. The fixing pin unit 510 may include a pin body portion 511 coupled to the guide link and extending with a predetermined length, and a pin head portion 512 in which at least portion thereof has a cross-section larger than a cross-section of the fixing body unit 520. The fixing body unit 520 may have a slope formed in an entrance thereof, which becomes narrower from the outside of the body toward the fixing ring 521 so as to help the fixing pin unit 510 enter the fixing ring 521. The fixing ring 521 may be made of an elastic member, and may be provided with a fixing hole 522 into which the fixing pin unit 510 may be inserted. In a state in which an external force is not applied, a fixing hole 522 may be formed larger than a cross-section of a head portion of the fixing pin unit 510 may be formed.

As illustrated in FIGS. 4 and 5A, the fixing pin unit 510 may be formed on the guide link unit 400 (e.g., formed on the first link 410), and the fixing body unit 520 may be formed in the fuselage 10. If the first shaft unit 110 has been retracted into the fuselage 10 by rotating the second shaft unit 120, the fixing pin unit 510 formed on the guide link unit 400 may be retracted into the fixing ring 521 disposed in the fixing body unit 520 as illustrated in FIG. 5B. If the fixing pin unit 510 is completely inserted into the fixing ring 521, since the stopper 523 descends and pushes the fixing ring 521 from the outside, the fixing hole 522 of the fixing ring 521 may be formed smaller than the pin head portion 512 of the fixing pin unit 510 so that the guide pin may be fixed. The guide link unit 400 coupled to the fixing pin unit 510 may be fixed to the fuselage 10, and similarly, the landing gear 100 coupled to the guide link unit 400 may be fixed to the fuselage 10. The stopper 523 may be operated by recognizing a signal (e.g., a weight on wheel (WOW) switch signal of the fuselage 10). The WOW switch signal of the mobile object may be turned off during flight, and when the WOW switch signal is turned off, the stopper 523 may be kept in a state in which the stopper 523 descends (e.g., a state in which the fixing pin unit 510 is fixed to the fuselage 10).

Figure 6:
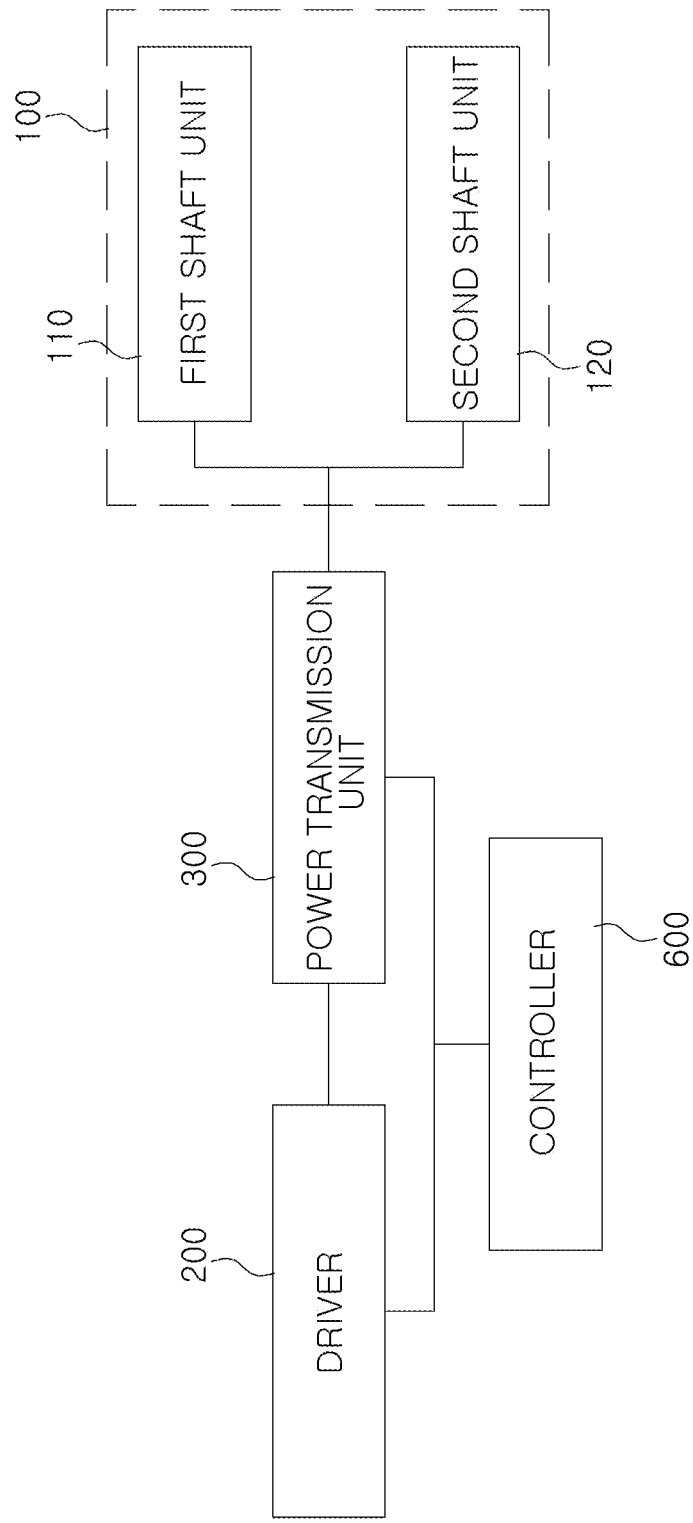
FIG. 6 is a block diagram of the gear system for a mobile object.

FIG. 6 is a block diagram of the gear system for a mobile object.

The gear system for a mobile object according to the present disclosure may further include the first shaft unit 110, the second shaft unit 120, the driver 200, the power transmission unit 300, and a controller 600.

The controller 600 may be implemented through one or more memories (e.g., including a nonvolatile memory (not illustrated)) configured to store data concerning an algorithm for controlling operations of various components of the aviation mobility or software instructions for reproducing the algorithm, and a processor (not illustrated) configured to perform operations described below using data stored in the corresponding memory. Here, the memory and the processor may be implemented as individual chips. Alternatively, the memory and the processor may be implemented as a single chip integrated with each other. The processor may take the form of one or more processors.

Each component of the landing system including the controller 600 may exchange data using communication links such as Ethernet, media-oriented systems transport (MOST), Flexray, Internet, long term evolution (LTE), 5th generation mobile telecommunication (5G), Wi-Fi, Bluetooth, Near Field Communication (NFC), Zigbee, Radio Frequency (RF), and the like.

The controller 600 may operate the driver 200 or the power transmission unit according to a user's operation or a preset command. For example, the controller 600 may connect the driver 200 and a power controller to the first shaft unit 110 according to the operation of the user's handle, and may control the first shaft unit 110 using the driver 200, thereby steering the mobile object in the process of driving on the ground. If the mobile object has taken off, the controller 600 may connect the driver 200 and the power controller to the second shaft unit 120 according to the user's related lever operation or a signal (for example, a WOW signal) from the fuselage 10 of the mobile object, and may control the second shaft unit 120 using the driver 200, so that the first shaft unit 110 may be retracted into the fuselage 10 to reduce the air resistance of the mobile object in flight. The controller 600 may control the first shaft unit 110 not to be rotated at a speed above a constant speed (e.g., nose wheel steering (NWS) reference speed), and may perform a steering operation through the first shaft 110 (e.g., only) at a speed less than or equal to the constant speed, for example, based on the speed of the landing and gliding mobile object.

If the first shaft unit 110 is retracted into the fuselage 10, the controller 600 may control the fixing unit 500 to fix the first shaft unit 110 to the fuselage 10. The controller 600 may manipulate the stopper 523 based on a signal (e.g., a WOW switch signal) capable of detecting a position of the fixing pin unit 510 attached to the guide link unit 400 or the flight of the fuselage 10, thereby fixing the fixing pin unit 510 to the fixing body unit 520 formed in the fuselage 10 or releasing the fixing of the fixing pin unit 510.

The controller 600 may be coupled to one or more sensors (not illustrated) connected to the fuselage, and may obtain data on the state of the fuselage. For example, the controller 600 may obtain data on the speed of the fuselage and determine whether to allow steering of the first shaft unit 110 based on the speed of the fuselage 10 driving on the ground. The controller 600 may obtain a weight on wheel (WOW) switch signal, and may introduce the landing gear 100 into the fuselage 10 by controlling the second shaft unit 120 based on the WOW signal, and/or fix the retracted landing gear 100 using the fixing unit 500.

Figure 7:
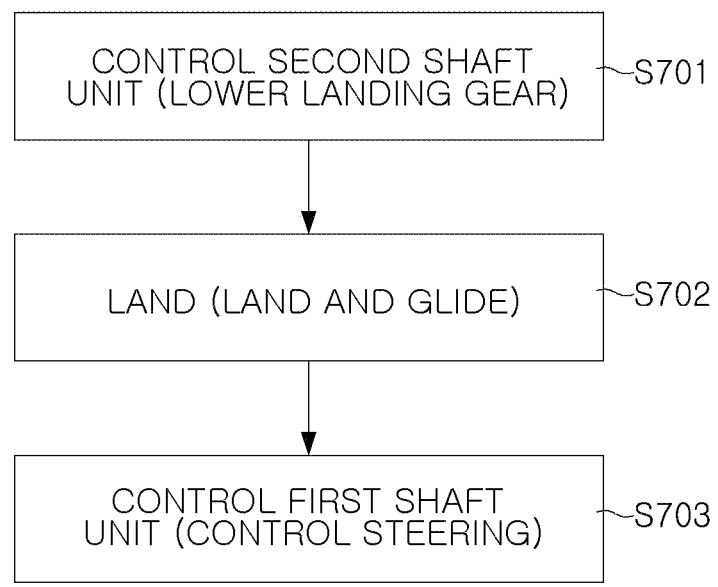
FIG. 7 is a flowchart of the gear system for a mobile object during landing.

FIG. 7 is a control flowchart of the landing gear 100 during landing according to the present disclosure.

Referring to FIG. 7, the landing gear 100 may be lowered by controlling the second shaft unit 120 for landing (S701). For example, the fixing unit 500 fixing the guide link unit 400 may be released by increasing the stopper 523, and the power transmission unit 300 may couple the driver 200 and the second shaft unit 120 to rotate the second shaft 121 according to the driving force of the driver 200, thereby lowering the landing gear 100.

In a state in which the landing gear 100 is lowered, the fuselage 10 of the mobile object may be manipulated to allow the mobile object to land. The process of landing the mobile object may stabilize the fuselage, provide precise access of the mobile object to the ground, perform flare flight, and allow the mobile object to land on the ground. A flare, which may be one of the aeronautical control methods, may be a method for the mobile object to land on the ground by reducing a sink rate while continuously generating lift by raising a nose section as the speed decreases. In this case, as the nose section is raised, the speed decreases, but instead, since the lift can be compensated as much, the mobile object may land on the ground while maintaining a low sink rate. The fuselage 10 of the mobile object may land and glide until the speed thereof becomes a predetermined speed or less after landing. If the speed of the fuselage 10 of the mobile object is greater than or equal to a predetermined speed, the first shaft unit 110 may be locked so as not to be steerable for safety reasons.

If the fuselage 10 of the mobile object mobility drives below the predetermined speed (e.g., the nose wheel steering (NWS) reference speed) after landing, the first shaft unit 110 may be controlled to steer the driving direction of the fuselage 10. For example, the power transmission unit 300 may steer the driving direction of the fuselage 10 by connecting and/or coupling the driver 200 to the first shaft unit 110 and rotating the first shaft 112 according to the driving force of the driver 200.

According to an aspect of the present disclosure, a gear system for a mobile object may include: a first shaft unit configured to adjust a driving direction of a fuselage; a second shaft unit coupled to the first shaft unit and configured to retract the first shaft unit into the fuselage or extend the first shaft unit, retracted into the fuselage, from the fuselage; a driver configured to supply driving force through which the first shaft unit and the second shaft unit can move; and a power transmission unit configured to selectively transmit the driving force of the driver to one of the first shaft unit and the second shaft unit by coupling the driver to one of the first shaft unit and the second shaft unit.

The driver may include an electric motor for transmitting driving force to the first shaft unit and the second shaft unit.

The driver may supply the driving force to the first shaft or the driving force to the second shaft through one electric motor.

The second shaft unit may include: a first gear formed on at least a portion of an outer circumferential surface of a second shaft; a second gear spaced apart from the first gear and connected to the power transmission unit; and a flexible drive transmission member configured to connect the first gear and the second gear.

The flexible drive transmission member may include a gear chain or a timing belt.

The gear system for a mobile object may further include a guide link unit configured to guide a path through which the first shaft unit is retracted into or extended from the fuselage.

The guide link unit may include: a first link in which one end thereof is coupled to the fuselage; and a second link in which one end thereof is coupled to the first link and the other end thereof is coupled to the first shaft unit.

The gear system for a mobile object may further include a fixing unit configured to fix the first shaft unit while being retracted into the fuselage.

The gear system for a mobile object may further include a guide link unit configured to guide a path through which the first shaft unit is retracted into or extended from the fuselage, and the fixing unit may fix the fuselage and the guide link unit in a state in which the first shaft unit is retracted into the fuselage.

The fixing unit may include a fixing pin unit protruding from at least a portion of the guide link unit, and in a state in which the first shaft unit is retracted into the fuselage, the fixing pin unit may be inserted into and fixed to a fixing body unit provided in the fuselage.

The fixing pin unit may include: a pin body portion in which one end thereof is coupled to the guide link unit, and which protrudes from the guide link unit to have a predetermined length; and a pin head portion which is provided in the other end of the pin body portion, and in which at least a portion thereof forms a cross-sectional area larger than that of the pin body portion.

The fixing body unit may include: a fixing ring configured to form a fixing hole through which the fixing pin unit can penetrate; and a stopper reducing a size of the fixing hole.

According to another aspect of the present disclosure, a gear system for a mobile object may include: a landing gear including a first shaft and a second shaft which rotate in different directions, wherein the first shaft can change a driving direction of a fuselage taxiing on the ground, and the second shaft can retract or extend the first shaft into or from the fuselage; and a driver configured to supply driving force through which one of the first shaft and the second shaft can rotate, and the driver may supply the driving force to the first shaft or the driving force to the second shaft through one electric motor.

The gear system for a mobile object may further include: a power transmission unit configured to connect one of the first shaft and the second shaft to the driver; and a controller configured to control the driver and the power transmission unit, and the controller may control the power transmission unit so that the driver is not connected to both the first shaft and the second shaft, or is connected to only one of the first shaft and the second shaft.

The controller may control the power transmission unit so that when a tire provided in the fuselage is in contact with the ground, the first shaft is connected to the driver.

The controller may control the power transmission unit to disconnect the driver from the first shaft when the speed of the fuselage exceeds a predetermined speed.

The controller may control the power transmission unit to connect the second shaft and the driver when the fuselage takes off from the ground.

The gear system for a mobile object may further include a fixing unit which can fix the first shaft to the fuselage in a state in which the first shaft is retracted into the fuselage, and the controller may control the fixing unit to fix the first shaft to the fuselage.

The controller may control the power transmission unit in a state in which the first shaft is fixed to the fuselage, to disconnect the driver from the first shaft and the second shaft.

Meanwhile, the gear system including the above configurations is not limited to being applied only to the landing gear of an air mobility, and may be applied to various types of mobility such as ground mobility.

Methods according to the present disclosure may be implemented in the form of program instructions that may be performed through various computer(s) and recorded in a computer-readable medium. The computer-readable medium may include program instructions, a data file, a data structure, or the like alone or in combination thereof. The program instructions recorded in a computer-readable medium may be specially designed and configured for the present disclosure or may be known to or usable by those skilled in the art of computer software.

Examples of computer-readable media include hardware devices specifically configured to store and perform program instructions, such as ROM, RAM, and flash memory. Examples of the program instructions may include not only a mechanical code such as things generated by a compiler but also a high-level language code executable on a computer using an interpreter. The aforementioned hardware unit may be configured to operate via one or more software modules for performing an operation of the present disclosure, and vice versa.

While various features of the present disclosure have been shown and described above, it will be apparent to those skilled in the art that modifications and variations could be made without departing from the scope of the present disclosure as defined by the appended claims.

What is claimed is:

1. A landing gear system comprising:
   a first shaft device configured to adjust a driving direction of a fuselage;
   a second shaft device coupled to the first shaft device and configured to retract the first shaft device into the fuselage or extend the first shaft device from the fuselage;
   a driver configured to supply driving force to operate one of the first shaft device and the second shaft device; and
   a power transmission device configured to transfer the driving force of the driver to the one of the first shaft device and the second shaft device by coupling the driver to the one of the first shaft device and the second shaft device,
   wherein the second shaft device comprises:
   a first gear formed on at least a portion of an outer circumferential surface of a second shaft;
   a second gear spaced apart from the first gear and connected to the power transmission device; and
   a flexible drive transmission member configured to couple the first gear and the second gear.

2. The landing gear system according to claim 1, wherein the driver comprises an electric motor configured to supply the driving force to the one of the first shaft device and the second shaft device.

3. The landing gear system according to claim 1, wherein the flexible drive transmission member comprises a gear chain or a timing belt.

4. The landing gear system according to claim 1, further comprising a guide link configured to guide a path through which the first shaft device is retracted into, or extended from, the fuselage.

5. The landing gear system according to claim 4, wherein the guide link comprises:
   a first link comprising one end coupled to the fuselage; and
   a second link comprising a first end coupled to the first link and a second end coupled to the first shaft device.

6. A landing gear system, comprising:
   a first shaft device configured to adjust a driving direction of a fuselage;
   a second shaft device coupled to the first shaft device and configured to retract the first shaft device into the fuselage or extend the first shaft device from the fuselage;
   a driver configured to supply driving force to operate one of the first shaft device and the second shaft device; and
   a power transmission device configured to transfer the driving force of the driver to the one of the first shaft device and the second shaft device by coupling the driver to the one of the first shaft device and the second shaft device;
   a guide link configured to guide a path through which the first shaft device is retracted into, or extended from, the fuselage; and a fixing unit configured to fix the first shaft device to the fuselage while the first shaft device is retracted into the fuselage, wherein the fixing unit comprises a fixing pin protruding from at least a portion of the guide link, and wherein in a state in which the first shaft device is retracted into the fuselage, the fixing pin is inserted into and fixed to a fixing body provided in the fuselage.

7. The landing gear system according to claim 6, wherein the fixing unit is configured to fix the fuselage and the guide link in a state in which the first shaft device is retracted into the fuselage.

8. The landing gear system according to claim 6, wherein the fixing pin comprises:

a pin body portion comprising a first end coupled to the guide link, wherein the pin body portion protrudes from the guide link to have a predetermined length; and a pin head portion disposed at a second end of the pin body portion, wherein at least a portion of the pin head portion forms a cross-sectional area larger than a cross-sectional area of the pin body portion.

9. The landing gear system according to claim 6, wherein the fixing body comprises:

a fixing ring configured to form a fixing hole through which the fixing pin can penetrate; and a stopper configured to reduce a size of the fixing hole.

10. A landing gear system comprising:

a landing gear comprising a first shaft and a second shaft configured to rotate in different directions, wherein the first shaft is configured to change a driving direction of a fuselage, and the second shaft is configured to retract or extend the first shaft into or from the fuselage; and a driver configured to supply driving force to rotate one of the first shaft and the second shaft, wherein the driver comprises an electric motor configured to supply the driving force to the one of the first shaft and the second shaft, wherein a shaft device comprises:

a first gear formed on at least a portion of an outer circumferential surface of the second shaft;

a second gear spaced apart from the first gear and connected to a power transmission device; and a flexible drive transmission member configured to couple the first gear and the second gear.

11. The landing gear system according to claim 10, further comprising:

a controller configured to control the driver and the power transmission device, wherein the controller is configured to control the power transmission device so that the power transmission device transfers the driving force of the driver to the one of the first shaft and the second shaft.

12. The landing gear system according to claim 11, wherein the controller is configured to control the power transmission device so that when a tire is in contact with the ground, driving force of the driver is transferred to the first shaft.

13. The landing gear system according to claim 11, wherein the controller is configured to control, based on a speed of the fuselage exceeding a predetermined speed, the power transmission device to decouple power transfer from the driver to the first shaft.

14. The landing gear system according to claim 11, wherein the controller is configured to control, based on the fuselage being taken off from the ground, the power transmission device to transfer driving force of the driver to the second shaft.

15. The landing gear system according to claim 11, further comprising a fixing unit configured to fix the first shaft to the fuselage in a state in which the first shaft is retracted into the fuselage, wherein the controller is configured to control the fixing unit to fix the first shaft to the fuselage.

16. The landing gear system according to claim 15, wherein the controller is configured to control the power transmission device, in a state in which the first shaft is fixed to the fuselage, to decouple power transfer from the driver to the first shaft and the second shaft.

* * * * *